United States Patent [19]

Bauer

[11] 4,251,731
[45] Feb. 17, 1981

[54] ARRANGEMENT FOR HOLDING X-RAY FILM VACUUM CASSETTES

[75] Inventor: Walter Bauer, Munich, Fed. Rep. of Germany

[73] Assignee: AGFA-Gevaert, A.G., Leverkusen, Fed. Rep. of Germany

[21] Appl. No.: 971,076

[22] Filed: Dec. 19, 1978

[30] Foreign Application Priority Data

Dec. 30, 1977 [DE] Fed. Rep. of Germany ....... 2758982

[51] Int. Cl.³ .............................................. G11B 1/00
[52] U.S. Cl. ................................... 250/468; 250/444
[58] Field of Search ................... 250/439, 444, 445 R, 250/446, 447, 448, 449, 450, 451, 456, 468, 471, 480; 354/275; 355/76, 73

[56] References Cited

U.S. PATENT DOCUMENTS

| | | | |
|---|---|---|---|
| 3,609,355 | 9/1971 | Schwarzer | 250/448 |
| 3,883,746 | 5/1975 | Gifford | 250/480 |
| 3,884,818 | 5/1975 | Tomito et al. | 250/480 |
| 4,132,897 | 1/1979 | Ohlson et al. | 250/468 |

*Primary Examiner*—Alfred E. Smith
*Assistant Examiner*—Thomas P. O'Hare
*Attorney, Agent, or Firm*—Michael J. Striker

[57] ABSTRACT

The patient's breast is pressed against an X-ray film vacuum cassette inserted into a holding arrangement mounted on the X-ray exposure-taking machine. With the patient in position, the technician can remove and insert cassettes from the side, without requiring the patient to move back away from the cassette holding arrangement as with prior-art holding arrangements. Two opposite ends of the loading platform of the holding arrangement are each provided with two holding brackets mounted slidable towards and away from the respective ends of the loading platform, but spring-biased towards the respective ends of the loading platform. The technician grips one end of the cassette, pushes its other end against the two holding brackets located remote from the side at which he is located, pressing those two holding brackets away from the holding platform until the end of the cassette held by him clears the two holding brackets proximate to him, whereupon he swings the cassette flat against the loading platform and relaxes his grip, the biasing springs pulling the two remote holding brackets towards the loading platform. The holding brackets extend along the narrow sides of the cassette and have inward ridges fitting over the edges of the cassette.

8 Claims, 2 Drawing Figures

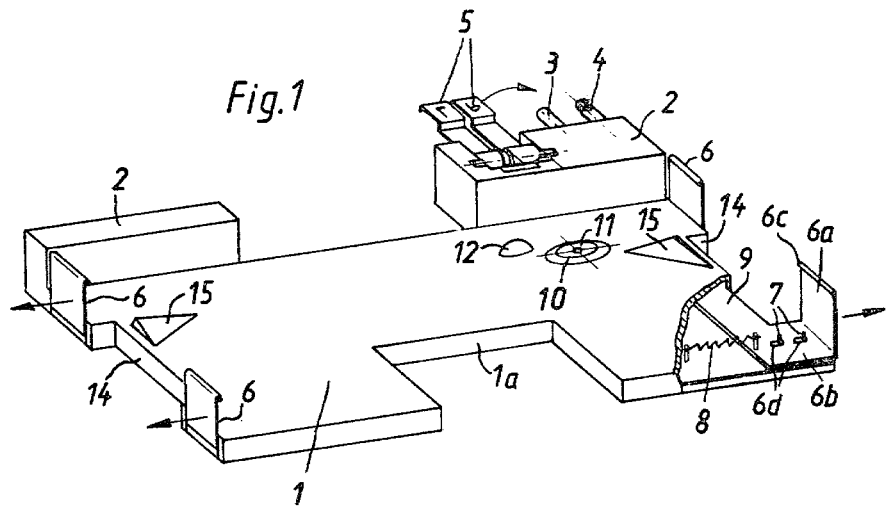
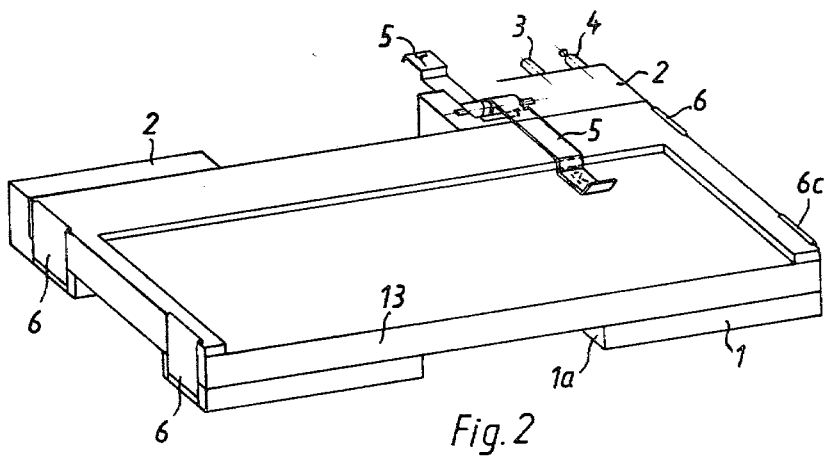

ARRANGEMENT FOR HOLDING X-RAY FILM VACUUM CASSETTES

BACKGROUND OF THE INVENTION

The present invention concerns arrangements used to hold X-ray film vacuum cassettes in proper exposure position on an X-ray exposure-taking machine, expecially for mammographic applications.

A holding arrangement of this type is already known, in which the vacuum cassette is shoved into the holding arrangement from in front, i.e., from the side of the holding arrangement at which the patient herself would be positioned during the performance of an X-ray exposure. With this known holding arrangement, when cassettes are to be exchanged the patient must lean herself back or step away from the holding arrangement, in order to permit the technician to remove one cassette and insert the next. The cassette is slid into the holding arrangement between two fixed and stationary lateral guide structures, and during the last little part of the insertion the cassette locks into place in the holding arrangement. Especially in the case of mammography, it is common to take X-ray exposures of the patient's breast from the side, and for this reason the cassettes must be capable of being held in vertically arranged adapters. With conventional adapters of the type described above, the cassette is firmly connected to the adapter only at the end of the cassette where the locking action referred to above is established, and at the other end of the cassette the cassette can swing away from its proper position. Additionally, it sometimes occurs that the patient's skin becomes caught in and pinched between the adapter and the cassette.

SUMMARY OF THE INVENTION

It is accordingly a general object of the invention to provide a holding arrangement for X-ray film vacuum cassettes of the type referred to above, but so designed as to afford an unshakeably firm holding action for the cassette, even for example if the cassette is to be oriented vertically.

A related object is to provide a holding arrangement of the type in question so designed as to avoid the awkwardness characterizing known holding arrangements at the times the technician must switch cassettes with the patient positioned for X-ray exposures.

In accordance with the present invention, this is accomplished using a loading platform structure fixedly securable to the X-ray exposure-taking machine, with the loading platform being provided at two opposite sides thereof with spring-biased holding brackets positioned to engage two opposite ends of the cassette and yieldable to facilitate insertion and removal of cassettes.

With the present invention, the cassette can be readily inserted into and removed from the holding arrangement from the side of the holding arrangement, not requiring insertion and removal from the front, i.e., not from the side of the cassette at which the patient is positioned as in the prior art, and no matter how the cassette is to be oriented, e.g., horizontal or vertical, the cassette is firmly held against the loading platform structure. Also, the inventive holding arrangement permits the technician to both insert a cassette and thereafter remove it readily using only a single hand, which was not possible with the prior-art cassette holding arrangement because the technician needed to use his second hand to release the locking action serving to lock the cassette in position in the holding arrangement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 depicts in perspective view an exemplary embodiment of the inventive holding arrangement for X-ray film vacuum cassettes, with no cassette present in the holding arrangement; and FIG. 2 depicts the holding arrangement of FIG. 1, with a cassette inserted into position.

DESCRIPTION OF THE PREFERRED EMBODIMENTS

In FIG. 1, numeral 1 denotes a cassette loading platform one side of which is provided with two mounting blocks 2 for securing the illustrated cassette holding arrangement to an X-ray exposure-taking machine, e.g., by means of non-illustrated bolts, clamps, or the like. One of the two mounting blocks 2 is provided with a suction connector 3 for connecting the loading platform to a (non-illustrated) vacuum pump; an electrical connector 4 for electrical connection of the holding arrangement to the on-off switch of such vacuum pump; and two swingable flap members 5 provided with stamped-out cut-outs having the shapes of the letters "L" and "R," swingable into the path of exposure radiation.

The two oppositely located free sides of the loading platform 1 are each provided with two holding brackets 6. Each individual holding bracket 6 is preferably an angled member having a holding leg 6a and a guide leg 6b, with the guide leg 6b being received in a guide slot in the side of the holding platform for extension and retraction, or else being similarly guided on the lower face of the loading platform 1. The holding legs 6a extend away from the edges of the loading platform 1 and at their free ends are provided with inwardly projecting ridges 6c located to fit over the upper edge of an inserted cassette 13 (see FIG. 2). The guide legs 6b of the holding brackets 6 are provided with guide slots 6d through which project guide pins 7 rigidly secured to loading platform 1. Finally, each holding bracket 6 is provided with a respective tension spring 8, one end of which is connected to the holding bracket 6 and the other end to the loading platform 1. For improved stability the two holding brackets 6 at each side of the loading platform are, in this embodiment, parts of a single angled member and are connected together by an integral intermediate web 9.

The loading platform 1 is provided with a slight elevation 10 located and configured to mate with the (non-illustrated) suction cup or suction structure on the underface of the vacuum cassette. Elevation 10 is provided at its center with a bore 11 which communicates, interiorly of loading platform 1, with the suction connector 3 mentioned above. Also, loading platform 1 is provided with a depressible microswitch 12 which is electrically connected, interiorly of loading platform 1, with the electrical connector 4 mentioned above; when a vacuum cassette is inserted into the holding arrangement, the cassette inherently depresses microswitch 12, causing the (non-illustrated) vacuum pump to be switched on. Loading platform 1 is additionally provided with a sizable cut-out 1a permitting exposure radiation to pass through the holding arrangement to a (non-illustrated) radiation-dose measuring device without being in any way hindered by the loading platform itself.

In operation, the illustrated and described holding arrangement is rigidly secured, at its mounting blocks 2, onto an X-ray exposure-taking machine. The technician, using only one hand, holds the X-ray film vacuum cassette 13 and lays its leading end against the inner faces of the holding legs 6a of two of the holding brackets 6, e.g., the two shown at the right in FIG. 1, and pushes forward thereby causing these two holding brackets 6 to extend laterally out of the side of loading platform 1 against the biasing force of the associated tension springs 8. When these two holding brackets 6 have been thusly pressed out into extended position to an extent such that the end of the cassette 13 gripped by the technician has cleared the other two holding brackets, the technician swings the cassette flat into engagement with the major surface of loading platform 1 and he then ceases pushing against the right two holding brackets 6 so that their associated tension springs 8 can push the cassette, in the opposite direction towards the other two holding brackets 6, i.e., until the cassette 13 is positioned as shown in FIG. 2, whereupon the technician removes his hand from the cassette. Of course, the technician can do this with an ease and quickness such that he does not separately consider the individual movements just described, but instead inserts the cassette into operative position with what is perceived by him as being virtually a single and simple movement. When the technician wishes to remove the cassette 13, he presses against, e.g., the left end of the cassette 13 (i.e., as viewed in FIG. 2), pushing the cassette rightwards with one hand to once more displace the right two holding brackets 6 into extended position, and when the cassette has been pushed rightwards out of engagement with the left two holding brackets 6, the technician merely lifts the cassette out. Advantageously, the loading platform 1 is provided with cutouts 14 at the two sides thereof having the holding brackets 6. In this way, the technician can grip the end of the cassette 13 with his fingers, so that when he has pushed the cassette against the right (or the left) holding brackets 6 and is ready to lift the cassette out, he will already have a grip on the end of the cassette and can lift out directly.

FIG. 2 depicts the cassette 13 in inserted or loaded position. Also, the swingable flap member 5 provided with the R-shaped cut-out is shown swung into position in the path of exposure radiation. A magnet, or another holding or biasing means, can be provided to assure that when one of these flap members 5 is swung into operative position it stays in that position until intentionally swung away.

In mammography, it is a typical practice to press the patient's breast against the cassette using a back-up plate, i.e., with the breast squeezed pressed against the cassette between the cassette and the back-up plate. Experience has indicated that, extremely often, after the back-up plate has been put into position and the patient's breast is being firmly pressed against the cassette, the physician or technician decides to slightly reposition the breast. With conventional adapters, this repositioning typically results in shifting of the cassette itself. The loading platform 1 illustrated is provided with angled elevations 15 located to engage the interior corners of the cassette's frame, to prevent such shifting of the cassette.

It will be understood that each of the elements described above, or two or more together, may also find a useful application in other types of constructions differing from the types described above.

While the invention has been illustrated and described as embodied in an X-ray film vacuum cassette holding arrangement specifically designed for mammographic use, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An X-ray film vacuum cassette-holding arrangement of the type used to hold X-ray cassettes in position on an X-ray exposure-taking machine, comprising an elongated loading platform mountable on the machine and having two ends spaced from one another in the direction of elongation and a cassette-supporting surface intermediate said ends; at least one holding bracket at each of said ends and each having a portion projecting upwardly beyond said surface; means mounting each of said brackets for movement in said direction of elongation; and biasing means urging each of said brackets resiliently towards the other so that, on engagement of one end part of a cassette with one of said brackets and pressure thereagainst in said direction of elongation but away from the other bracket, said one bracket will yield sufficiently for said cassette to be swung about said one end part thereof so that its other end part will come to rest on said surface and, when the pressure is thereupon released, the cassette will be urged by the biasing means acting upon said one bracket to slide with said other end part against the other bracket so as to be firmly held in place at said end parts by said brackets.

2. The cassette holding arrangement defined in claim 1, the loading platform being provided with a suction opening so positioned on the loading platform as to register with the suction opening of an inserted X-ray film vacuum cassette and a suction connector communicating with the loading platform's suction opening for connecting the loading platform's suction opening to a vacuum pump.

3. The cassette holding arrangement defined in claim 1, the loading platform being furthermore provided with a cassette-responsive vacuum-pump-control switch and an electrical connector electrically connected to the cassette-responsive switch and connectable to a vacuum pump.

4. The cassette holding arrangement defined in claim 1, the loading platform being provided with anti-shift projections operative for engaging recesses in a major surface of an inserted cassette.

5. The cassette holding arrangement defined in claim 1, the holding brackets being mounted for swinging movement towards and away from the respective ones of the two opposite end parts of an inserted cassette.

6. The cassette holding arrangement defined in claim 1, the holding brackets being angled members each comprising a guide leg extending parallel to the loading platform, the loading platform being provided with guidance structure receiving and guiding the guide legs for movement towards and away from the respective ones of the two opposite end parts of an inserted cassette, each angled member also comprising a holding leg extending transversely to the respective guide leg away from the loading platform, each holding leg having at its free end an inward ridge located to fit over the edge of an inserted cassette.

7. The cassette holding arrangement defined in claim 6, the guidance structure of the loading platform comprising portions of the loading platform having guide slots in which the guide legs of the angled members are slidably received.

8. The cassette holding arrangement defined in claim 6, there being at least two such holding brackets at each of said two opposite ends of the loading platform, the two holding brackets at each such end being integral with each other and their guide legs being connected via an integral web extending parallel to the loading platform.

* * * * *